United States Patent

Hiruta et al.

(10) Patent No.: US 10,850,706 B2
(45) Date of Patent: Dec. 1, 2020

(54) VEHICLE CONTROL SYSTEM

(71) Applicant: HONDA MOTOR CO., LTD., Tokyo (JP)

(72) Inventors: Shigenori Hiruta, Wako (JP); Naoki Kato, Wako (JP); Yuji Saito, Tokyo (JP); Hiroyuki Hayashi, Kawasaki (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/544,133

(22) Filed: Aug. 19, 2019

(65) Prior Publication Data

US 2020/0094779 A1 Mar. 26, 2020

(30) Foreign Application Priority Data

Sep. 25, 2018 (JP) .................................. 2018-179036

(51) Int. Cl.
*B60R 25/24* (2013.01)
*G07C 5/08* (2006.01)

(52) U.S. Cl.
CPC .............. *B60R 25/24* (2013.01); *G07C 5/085* (2013.01)

(58) Field of Classification Search
CPC ... B60R 25/24; B60R 2325/205; G07C 5/085; G07C 2209/08

USPC ...................... 340/5.28, 5.42, 4.6, 4.61, 4.62
See application file for complete search history.

(56) References Cited

U.S. PATENT DOCUMENTS

| | | | | |
|---|---|---|---|---|
| 6,636,145 B1* | 10/2003 | Murakami | ............. | G07B 15/00 340/5.42 |
| 2013/0073349 A1* | 3/2013 | Kolling | .................. | G07B 15/02 705/13 |
| 2014/0129053 A1* | 5/2014 | Kleve | .................... | B60R 25/24 701/2 |
| 2019/0050820 A1* | 2/2019 | Atsumi | .................. | G07B 15/00 |
| 2019/0366979 A1* | 12/2019 | Yanaga | .................... | B60R 25/24 |
| 2020/0097863 A1* | 3/2020 | Hiruta | ................ | G06Q 10/0631 |

FOREIGN PATENT DOCUMENTS

JP 2009-127284 6/2009

* cited by examiner

*Primary Examiner* — Edwin C Holloway, III
(74) *Attorney, Agent, or Firm* — Rankin, Hill & Clark LLP

(57) ABSTRACT

A control system for a vehicle used by a plurality of users determines, in response to a request for unlocking vehicle doors, whether to permit vehicle door unlocking depending on whether or not another booked usage time range is registered after one booked usage time range in which a usage end procedure has been performed, or whether vehicle door unlocking that does not use an electronic key for the one booked usage time range was performed during the time from the end of the usage end procedure to the current time.

5 Claims, 7 Drawing Sheets

FIG.5

| USER ID | ELECTRONIC KEY BASIC INFORMATION | USER TERMINAL INFORMATION |
|---------|----------------------------------|---------------------------|
| Pt-1    | VK001                            | TERM001                   |
| Pt-2    | VK002                            | TERM002                   |
| Pt-3    | VK003                            | TERM003                   |
| ⋮       | ⋮                                | ⋮                         |

FIG.6

| SCHEDULE ID | USER ID | BOOKED USAGE TIME RANGE | | STATUS |
| --- | --- | --- | --- | --- |
| | | SCHEDULED USAGE START DATE AND TIME | SCHEDULED USAGE END DATE AND TIME | |
| Sch-1 | Pt-1 | date_s10-time_s11 | date_e10-time_e11 | ENDED : date&time-1 |
| Sch-2 | Pt-3 | date_s20-time_s21 | date_e20-time_e21 | STARTED |
| Sch-3 | Pt-2 | date_s30-time_s31 | date_e30-time_e31 | YET TO START |
| .. | .. | .. | .. | .. |
| .. | .. | .. | .. | .. |
| .. | .. | .. | .. | .. |

VEHICLE CONTROL SYSTEM

INCORPORATION BY REFERENCE

The present application claims priority under 35 U.S.C. § 119 to Japanese Patent Application No. 2018-179036 filed on Sep. 25, 2018. The content of the application is incorporated herein by reference in its entirety.

BACKGROUND OF THE INVENTION

Field of the Invention

The present invention relates to a vehicle control system that is used for a vehicle used sequentially by a plurality of users and controls whether to permit operation of the vehicle for the usage.

Description of the Related Art

A method of using a vehicle, such as car sharing, in which a plurality of users sequentially use a single vehicle is known. With such a shared vehicle, an electronic key that is valid only in a booked usage time range, for example, is issued to a user, and the use of the vehicle by the user is limited to the booked usage time range. In other words, after the booked usage time range, the door cannot be, for example, unlocked with the electronic key, and the entrance to the vehicle interior and the use of the vehicle are not allowed.

A vehicle electronic key system is conventionally known in which even after a booked usage time range, door unlock by the user's electronic key is permitted if the vehicle is not in a predetermined return position, in order to avoid the possibility that the user cannot get to a return position within the booked usage time range and the vehicle cannot be used at any locations other than the return position (see Japanese Patent Laid-Open No. 2009-127284).

When unlocking a vehicle door is needed after a booked usage time range can be in such a situation that the user locks the vehicle door in a return position and then notices, for example, that he left a personal belonging in the interior of the vehicle after the booked usage time range and attempts to collect the personal belonging.

However, with the aforementioned conventional system, after the booked usage time range, the door can be unlocked only at locations other than the return position, leaving room for improvement in the convenience of access to the vehicle interior for, for example, collecting such a lost belonging after return to the return position.

An object of the present invention, which has been made in view of the above-described background, related to a vehicle that a plurality of users sequentially use is to improve user's convenience by enabling access to the vehicle interior after use regardless of the position of the vehicle.

SUMMARY OF THE INVENTION

One aspect of the present invention is a vehicle control system that controls operation of a vehicle to be used by a plurality of users, the vehicle control system comprising: a schedule management unit that manages a booked usage time range related to usage of the vehicle by each of the users; an information medium that holds an electronic key that was issued in relation to the booked usage time range and enables usage of the vehicle in the booked usage time range; a usage end detection unit that detects execution of a usage end procedure for the vehicle in the booked usage time range; a usage limiting unit that determines whether to permit door unlocking for the vehicle, the door unlocking being performed after the usage end procedure and using the electronic key; and a door unlocking unit that unlocks a door of the vehicle in response to a door unlocking request made using the electronic key, provided that the usage limiting unit determines to permit door unlocking for the vehicle, wherein the usage limiting unit determines whether to permit door unlocking for the vehicle depending on whether or not another booked usage time range exists after one booked usage time range for which the usage end procedure was performed, and/or whether door unlocking, not using the electronic key that was issued for the one booked usage time range, for the vehicle was performed during the period from the end of the usage end procedure to a current time.

In another aspect of the present invention, after the usage end procedure and until the start of the other booked usage time range subsequent to the one booked usage time range, the usage limiting unit permits door unlocking for the door unlocking request using the electronic key that was issued in relation to the one booked usage time range.

In another aspect of the present invention, after the usage end procedure, during the period from the end of the usage end procedure to the current time, until the door of the vehicle is unlocked without the electronic key that was issued in relation to the one booked usage time range, the usage limiting unit permits door unlocking for the door unlocking request using the electronic key that was issued in relation to the one booked usage time range.

In another aspect of the present invention, after the usage end procedure related to the one booked usage time range, when permitting door unlocking made according to the door unlocking request using the electronic key that was issued in relation to the one booked usage time range, the usage limiting unit prohibits the vehicle from being started using the electronic key.

In another aspect of the present invention, the vehicle control system further comprises a usage information providing unit that notices, after the usage end procedure related to the one booked usage time range, a communication terminal of a user who has taken the usage end procedure, of whether or not the other booked usage time range exists and/or whether unlocking operation for the vehicle occurred after the usage end procedure.

Advantageous Effects of Invention

The present invention related to a vehicle that a plurality of users sequentially use can improve user's convenience by enabling access to the vehicle interior after use regardless of the position of the vehicle while considering use of the vehicle by other users.

BRIEF DESCRIPTION OF THE DRAWINGS

FIG. 5 is a diagram showing an example of a user DB held in the usage management server shown in FIG. 2;

FIG. 6 is a diagram showing an example of a schedule DB held in the usage management server shown in FIG. 2.

DETAILED DESCRIPTION OF THE PREFERRED EMBODIMENTS

An embodiment of the present invention will now be described with reference to the accompanying drawings.

1. CONFIGURATION OF VEHICLE CONTROL SYSTEM 100

Figure 1:
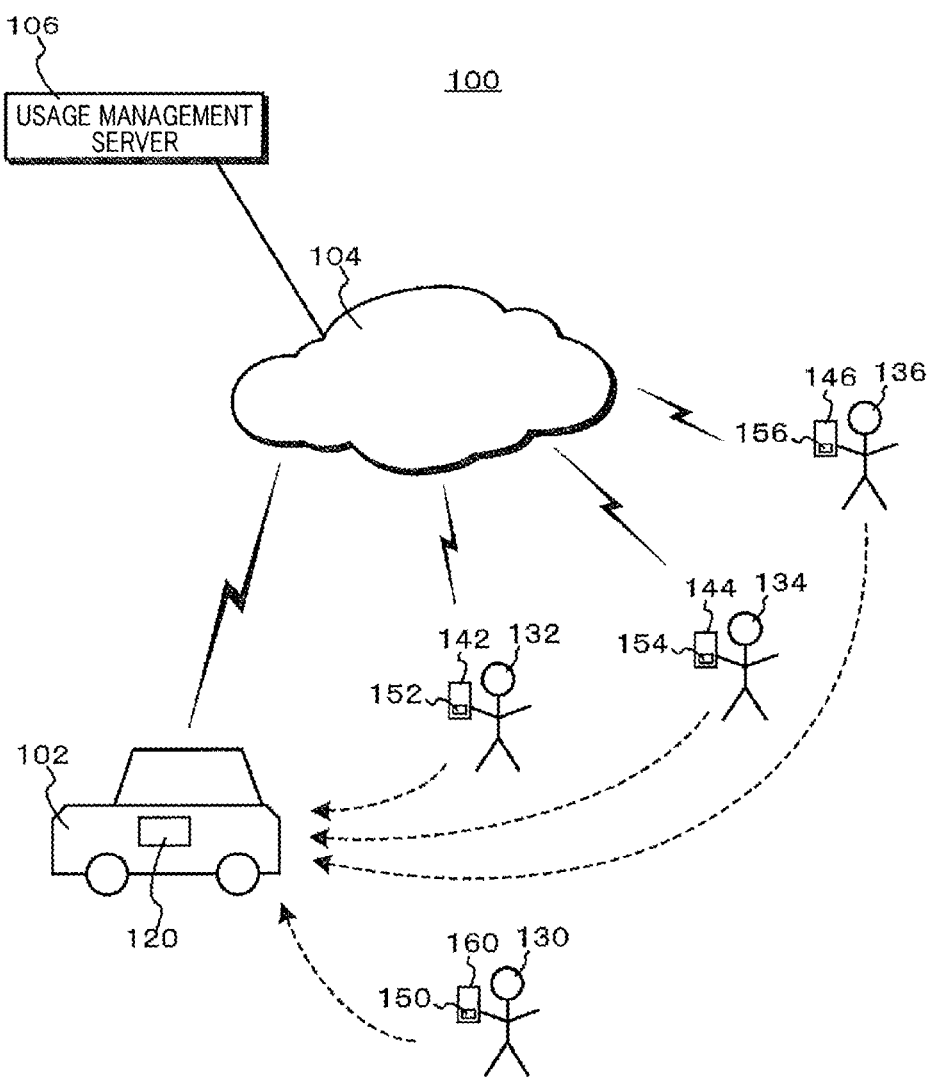
FIG. 1 is a diagram showing the configuration of a vehicle control system according to one embodiment of the present invention.

FIG. 1 is a diagram showing the configuration of a vehicle control system according to the present invention. This vehicle control system 100 (hereinafter simply referred to as system 100) consists of a vehicle 102 and a usage management server 106 communicably connected to the vehicle 102 via a network 104. In this embodiment, the network 104 is, for example, the Internet connected via a public line or the like.

The vehicle 102 is used for, for example, car sharing and is a vehicle that a plurality of users sequentially use. In this embodiment, as an example, the vehicle 102 is used by the owner 130 of the vehicle 102 who provides the vehicle 102 to the car sharing, and users 132, 134, and 136 who rent the vehicle 102 from the owner 130 and use it.

The vehicle 102 has an on-vehicle system 120. The usage management server 106 cooperates with the on-vehicle system 120 of the vehicle 102 to control the operation related to the use of the vehicle 102 by the aforementioned plurality of users. It should be noted that the vehicle 102 is, for example, an electric car in this embodiment.

The usage management server 106 assigns a unique user ID and electronic key basic information to an applicant for use of the vehicle 102, and stores it with the E-mail address of the portable terminal of this applicant for use as user information in a user DB 250 (described later). Thus, the usage management server 106 registers this applicant for use as a user. Here, the electronic key basic information includes authentication information which is used upon the authentication of the electronic key by the vehicle 102.

The usage management server 106 receives a booking for use of the vehicle 102 from the user and sets a booked usage time range. The usage management server 106 stores a booking schedule indicating the set booked usage time range and the user ID of the user in a schedule DB 252 (described later). Here, the usage management server 106 also stores a schedule of the usage of the vehicle 102 by the owner 130 as a booking schedule in the schedule DB 252. For example, a time range that the owner 130 ensures in advance, for example, in order to use the vehicle 102 by himself or maintain the vehicle 102, and that cannot be booked for use by the users 132, 134, and 136 (for example, so-called "booking-prohibited time range") is also referred to as "booked usage time range" in this embodiment. However, the owner 130 can, for example, unlock the doors of the vehicle 102 by using a FOB key 160 at his discretion, for example, not at a time within his booked usage time range but a time out of the booked usage time range of any other users.

When having generated a booking schedule for a user, the usage management server 106 generates an electronic key including a schedule ID for the booking schedule and information on the booked usage time range by using electronic key basic information generated for the user. The usage management server 106 then transmits the generated electronic key to the portable terminal of the user.

In the description below, "electronic key" and "key code" are treated as synonyms. In the case where particularly a key code, which is a representation of an electronic key, should be explicitly expressed, the term "key code" is used separately or together with the term "electronic key".

In this embodiment, users 132, 134, and 136 use the vehicle 102 by using key codes 152, 154, and 156 including electronic key basic information, booking time range information, and a schedule ID downloaded from the usage management server 106 to portable terminals 142, 144, and 146, respectively. The owner 130 of the vehicle 102 uses the vehicle 102 by using a key code 150 stored in the FOB key 160.

The on-vehicle system 120 of the vehicle 102 authenticates, for example, the key code 152 that the user 132 has transmitted from the portable terminal 142 on the basis of the electronic key basic information included in this key code 152, and acquires information on the booked usage time range included in this key code 152. If the current time is within the acquired booked usage time range, the on-vehicle system 120 then accepts a door unlocking request and a vehicle start request for the vehicle 102 that use this key code 152, and executes these operations.

Upon door unlocking, the vehicle 102 stores, as a door unlocking history, a door unlocking record including the schedule ID included in the key code used for the door unlocking. Similarly, upon door unlocking using the key code 150 of the FOB key 160 of the owner 130, the vehicle 102 stores, as a door unlocking history, a door unlocking record indicating this fact.

Afterwards, for example, to terminate the use of the vehicle 102 in the booked usage time range, the user 132 transmits a usage end notice including his user ID to the usage management server 106, using his portable terminal 142, for example, through a browser to access to a website provided by the usage management server 106, thereby taking a usage end procedure for the vehicle 102 in the current booked usage time range.

As described above, the user 132 or the like uses the vehicle 102 within his booked usage time range stored in the schedule DB 252 of the usage management server 106. In the description below, a key code issued in relation to the booked usage time range for which the usage end procedure has been taken is also referred to as "a key code after usage" or "a usage-ended key code".

Upon reception of a usage end notice, the usage management server 106 transmits a usage time end notice including the schedule ID of the corresponding booking schedule to the vehicle 102. Thus, upon reception of a door unlocking request, for example, the vehicle 102 can determine whether or not the door unlocking request is a door unlocking request that uses a usage-ended key code. After the usage end procedure, the vehicle 102 limits, through the usage end procedure, the operation of the vehicle 102 related to an operation command (for example, a door unlocking request) using a usage-ended key code.

In this embodiment, in particular, after the usage end procedure related to the booked usage time range, upon reception of a door unlocking request including a usage-ended key code related to the booked usage time range, the vehicle 102 determines whether to permit door unlocking of the vehicle 102 in accordance with the following predetermined conditions. Note that which one of the following conditions will be used can be preset.

Condition A: after a usage end procedure for one booked usage time range, (A1) if no other booked usage time range is set after the one booked usage time range, door unlocking that uses a usage-ended key code is permitted through the usage end procedure, (A2) if any other booked usage time range is set after the one booked usage time range, until the start of the booked usage time range subsequent to the one booked usage time range, door unlocking that uses a usage-ended key code is permitted through the usage end procedure.

Condition B: after a usage end procedure is performed in relation to one booked usage time range, until door unlocking that does not use a usage-ended key code through the usage end procedure is performed (that is, until door unlocking by, for example, the user 132 different from the user who has taken the usage end procedure or the owner 130 is performed), door unlocking that uses the usage-ended key code is permitted.

When permitting door unlocking after a usage end procedure in accordance with the aforementioned conditions, the vehicle 102 prohibits the start of the vehicle 102 that is actuated using a key code issued in relation to the one booked usage time range.

Figure 4:
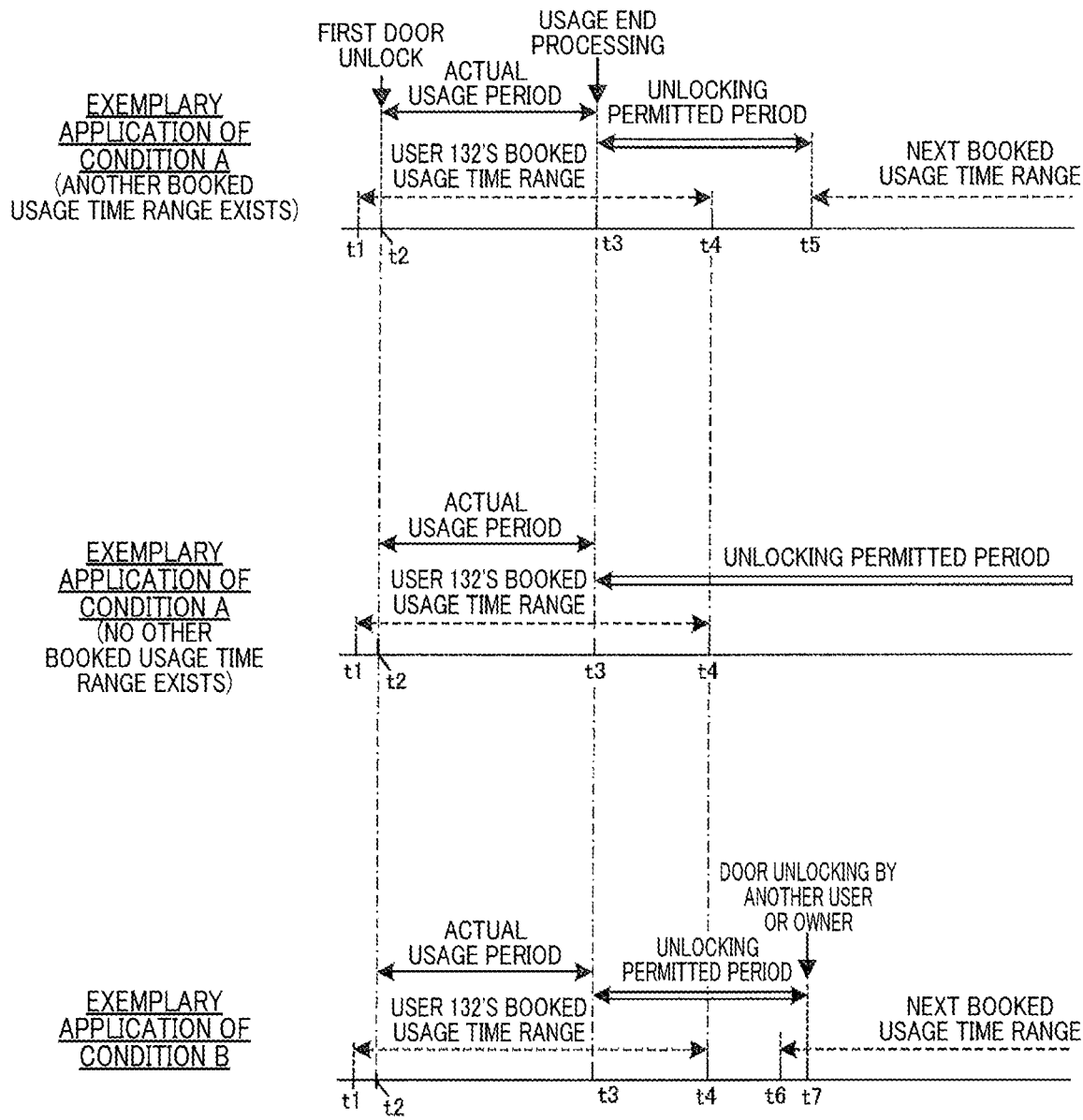
FIG. 4 is a diagram showing an example of a period during which the vehicle control system shown in FIG. 1 permits a user who has taken a usage end procedure to unlock a door.

FIG. 4 is a diagram showing an example of a period during which, in relation to a user who has taken a usage end procedure for a booked usage time range, for example, the user 132, door unlocking of the vehicle 102 is permitted in the conditions A and B after the usage end procedure. The upper and middle layers in FIG. 4 show example cases where the condition A is applied, but show the case where another booked usage time range is set and the case where another booked usage time range is not set, respectively. The lower layer of FIG. 4 shows the case where the condition B is applied.

The horizontal axes in the drawing all indicate the time. In any example case, the user 132 has a booked usage time range from the time t1 to the time t4 and, in the booked usage time range, the first door unlocking of the vehicle 102 is performed at the time t2 to start actual usage, and a usage end procedure is performed at the time t3 to terminate the usage of the vehicle 102. Hence, the key code 152 that the user 132 holds in the portable terminal 142 becomes a usage-ended key code after the time t3.

In one example case where the condition A shown in the upper layer of FIG. 4 is applied, after the booked usage time range (from the time t1 to the time t4) related to the user 132, the next booked usage time range that starts from the time t5 is set. In this case, an unlocking permitted period lasts from the time t3 to the time t5 at which the next booked usage time range starts. Here, the next booked usage time range may be set for another user or, as described above, the owner 130 of the vehicle 102.

In another example case where the condition A shown in the middle layer of FIG. 4 is applied, that is, in the case where no other booked usage time range is set after the booked usage time range related to the user 132, an unlocking permitted period lasts from the time t3 at which a usage end procedure is taken, and the user 132 is continuously allowed to unlock the doors of the vehicle 102.

Hence, in the case of the condition A, a limitation on the access of the user, who has taken the usage end procedure, to the vehicle interior is greatly relaxed while making special considerations to usage of the vehicle 102 by another user and the owner 130, so that the convenience of the user can be significantly improved. Note that the unlocking permitted period shown in the middle layer of FIG. 4 ends when another booked usage time is set thereafter and the start time of the other booked usage time has come. This is however not necessarily the case, and the unlocking permitted period shown in the middle layer of FIG. 4 can end according to another predetermined condition. For example, the unlocking permitted period can end after the lapse of a predetermined time (for example, 24 hours) from its start time (that is, the time t3).

Meanwhile, in the example case shown in the lower layer of FIG. 4, that is, in the example case where the condition B is applied, door unlocking of the vehicle 102 is performed by another user or the owner 130 at the time t7, so that the unlocking permitted period that starts at the time t3 ends at the time t7.

In other words, when the condition B is applied, for example, even if there is another booked usage time range that starts at the time t6, the user who has taken a usage end procedure immediately thereafter may be permitted to perform door unlocking until the time t7 at which actual usage of the vehicle 102 by another user in the other booked usage time range is started. Although the next booked usage time range that starts at the time t6 is supposed to be set in the example case shown in the middle layer of FIG. 4, this is not necessarily the case. In the case of the condition B, even if no other booked usage time range is set and no other user does not perform door unlocking, once the owner 130 performs door unlocking, the unlocking permitted period ends.

Hence, in the condition B, while making special considerations to the usage of the vehicle 102 by another user and the owner 130, a limitation on the access of the previous user to the vehicle interior is relaxed, thereby improving the convenience of the previous user. In the case of the condition B, unless another user performs unlocking after the time t3 at which a usage end procedure has been performed, the unlocking permitted period can continue as in the middle layer of FIG. 4. This unlocking permitted period may end in another predetermined condition. For example, as in the description of the middle layer of FIG. 4, the unlocking permitted period may end after the lapse of a predetermined time from its start time.

Thus, in the system 100, without preventing the usage of the vehicle 102 by another user and the owner 130, a limitation on the access of the previous user to the vehicle interior after a usage end procedure is relaxed, thereby improving user's convenience.

Further, in this embodiment, in order that the user 132 or the like who has taken a usage end procedure may know whether or not door unlocking is possible thereafter, the usage management server 106 notifies the portable terminal 142 or the like of the user 132 or the like who has taken that usage end procedure, of whether or not the next booked usage time range exists and/or whether or not door unlocking operation on the vehicle 102 has been performed after use.

2. CONFIGURATION OF USAGE MANAGEMENT SERVER 106

Figure 2:
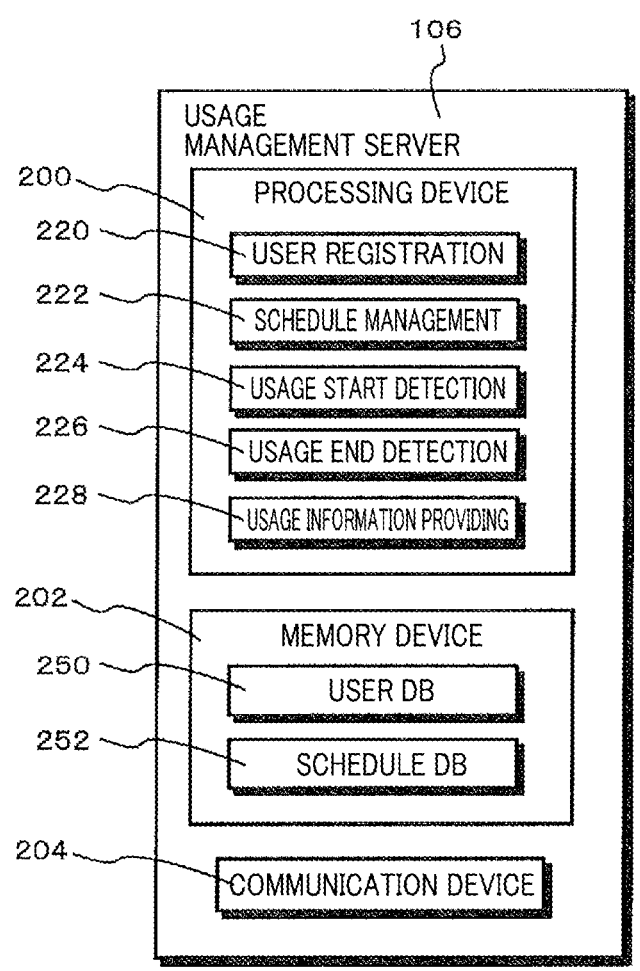
FIG. 2 is a diagram showing the configuration of a usage management server in the vehicle control system shown in FIG. 1.

FIG. 2 is a diagram showing the configuration of the usage management server 106. The usage management server 106 includes a processing device 200, a memory device 202, and a communication device 204. The memory device 202 is composed of, for example, a hard disc device and stores a user database (user DB) 250 and a schedule database (schedule DB) 252. The communication device 204 is a transceiver for wired communication and/or wireless communication for connecting the processing device 200 to the network 104.

The processing device 200 is, for example, a computer including a processor such as a central processing unit (CPU). The processing device 200 may include a read only memory (ROM) written with programs and a random access memory (RAM) for temporary storage of data. The processing device 200 includes, as functional elements or functional units, a user registration unit 220, a schedule management unit 222, a usage start detection unit 224, a usage end detection unit 226, and a usage information providing unit 228.

The functional elements included in the processing device 200 are implemented, for example, when the processing device 200, which is a computer, executes a program. It should be noted that the computer program may be stored in an arbitrary computer-readable memory medium. Alternatively, all or part of the aforementioned functional elements in the processing device 200 may be each composed of a hardware device including one or more electronic circuit components.

[2.1 User Registration Unit 220]

The user registration unit 220 receives registration information transmitted from the portable terminal of an applicant. The applicant can transmit registration information from the portable terminal to the usage management server 106, for example, by access to a website provided by the usage management server 106. Registration information includes the name of an applicant and terminal information for access to the portable terminal of the applicant. The user registration unit 220 generates a unique user ID and electronic key basic information for the applicant on the basis of registration information, and generates user information consisting of the generated user ID and electronic key basic information and user terminal information, which is the terminal information included in the registration information. The user registration unit 220 then saves the generated user information to the user DB 250 and registers the applicant as a user.

[2.2 User DB 250]

FIG. 5 is a diagram showing an example of the user DB 250 generated in the user registration unit 220. In the example case shown in the drawing, the user DB 250 is in the form of a table that includes columns of, from the left in the drawing, user ID, electronic key basic information, and user terminal information. In the table shown in the drawing, the second and later rows each have description of the corresponding user information. For example, the second to fourth rows show the user IDs Pt-1, Pt-2, and Pt-3, electronic key basic information VK001, VK002, and VK003, and user terminal information TERM001, TERM002, and TERM003, for the users 132, 134, and 136, respectively.

[2.3 Schedule Management Unit 222]

The schedule management unit 222 receives usage booking information transmitted from the user's portable terminal (for example, the portable terminal 142 of the user 132). This usage summary information includes a user ID and a requested usage time range related to a user who is a transmitter. If the requested usage time range included in the received usage booking information does not overlap with the booked usage time range already stored in the schedule DB 252, the schedule management unit 222 sets the time range indicated by the requested usage time range as a booked usage time range.

The schedule management unit 222 then generates a booking schedule including the user ID of a user who has booked the usage of the vehicle 102 and the related booked usage time range, and saves the generated booking schedule to the schedule DB 252. To be specific, the schedule management unit 222 generates, for example, a booking schedule including a schedule ID for identification of an individual booking schedule, the set booked usage time range, the user ID of a user who has transmitted the usage booking information, and a status, and saves the generated booking schedule as one record to the schedule DB 252.

Here, the "status" indicates the status of the usage of the vehicle 102 in the booked usage time range indicated by that booking schedule. The status is set to any of the following: "pre-start" that indicates a status before the start of usage of the vehicle 102, "started" indicating a status in which usage has started, and "ended" indicating a status in which usage has ended. The start time and end time of the usage of the vehicle 102 may be given to the statuses "started" and "ended". When generating a booking schedule, the schedule management unit 222 sets the status of the booking schedule to be generated to "pre-start". It should be noted that this status is set by the usage start detection unit 224 described later and the usage end detection unit 226 to "started" and "ended", respectively.

Moreover, the schedule management unit 222 refers to the user DB 250, and generates a key code (electronic key) that enables the usage of a vehicle 102 in the set booked usage time range by using electronic key basic information associated with the user ID of the user who has booked the usage of the vehicle 102. This key code includes information on the set booked usage time range and the schedule ID of the booking schedule related to the booked usage time range. The schedule management unit 222 then transmits the generated key code to the portable terminal of the user. Hence, for example, electronic keys 152, 154, and 156 each including information on the schedule ID for the corresponding booking schedule and the booked usage time range are saved to the portable terminals 142, 144, and 146 of the users 132, 134, and 136 who have taken a usage booking. Here, portable terminals 142, 144, and 146 correspond to information media for holding the electronic keys 152, 154, and 156 that have been issued in relation to the booked usage time range and enable the usage of the vehicle 102 in the booked usage time range.

[2.4 Schedule DB 252]

The schedule DB 252 consists of one or more booking schedules. FIG. 6 is a diagram showing one example of the schedule DB 252. In the example case shown in the drawing, the schedule DB 252 is in the form of a table that includes columns of, from the left in the drawing, schedule ID, user ID, booked usage time range, and status. Here, a booked usage time range consists of a scheduled usage start date and time and a scheduled usage end date and time that are the start time and the end time of the booked usage time range.

In the table shown in the drawing, the second and later rows each have description of a booking schedule. For example, the second to fourth rows show the booking schedule of the user 132 having the user ID Pt-1, the booking schedule of the user 136 having the user ID Pt-3, and the booking schedule of the user 134 having the user ID Pt-2, respectively. In the second row of the table shown in the drawing, the status column, which is the rightmost column, indicates the fact that, for the booking schedule that has the schedule ID Sch-1, the usage of the vehicle 102 by the user 132 having the user ID Pt-1 has "ended" at the date and time indicated by date & time-1. In the third row of the table shown in the drawing, the status column, which is the rightmost column, indicates the fact that, for the booking schedule that has the schedule ID Sch-2, the usage of the vehicle 102 by the user 136 having the user ID Pt-3 has "started". In the fourth row of the table shown in the drawing, the status column, which is the rightmost column, indicates the fact that, for the booking schedule that has the schedule ID Sch-3, the usage of the vehicle 102 by the user 134 having the user ID Pt-2 has "yet to start".

[2.5 Usage Start Detection Unit 224]

The usage start detection unit 224 receives a usage start notice, which will be described later, from a vehicle 102, thereby detecting the start of the usage of the vehicle 102 related to a booking schedule. Upon reception of the usage start notice, the usage start detection unit 224 refers to the schedule DB 252, and sets the status of a booking schedule, which has the same schedule ID as the schedule ID included in the received usage start notice, to "started".

[2.6 Usage End Detection Unit 226]

The usage end detection unit 226 detects the end of the usage of a vehicle 102 related to a booking schedule. To be specific, the usage end detection unit 226 refers to the schedule DB 252, in response to the reception of a usage end notice from the user's portable terminal (for example, the portable terminal 142 of the user 132). The usage end detection unit 226 confirms matching between the user ID of a booking schedule with the status "started" and the user ID included in the received usage end notice, and determines that the usage of the vehicle 102 related to the booking schedule has ended.

The usage end detection unit 226 then sets the status of the booking schedule for which determination has been made that usage has ended, to "end: date & time". Here, date & time is a usage end date and time, and is the date and time at which the usage end notice was received. In the description below in this embodiment, "set the status to "ended"" is specifically to set, as described above, information indicating the fact that the usage of the vehicle 102 has "ended" and information on the usage end date and time, in the status.

When the status of a booking schedule has been set to "ended", the usage end detection unit 226 transmits a usage time end notice including the schedule ID of the booking schedule to the vehicle 102. At the time, if other booking schedules exist in a time range after the booking schedule the status of which has been set to "ended" in the schedule DB 252, the usage end detection unit 226 puts the schedule ID of the next booking schedule and information on the related booked usage time range in the usage time end notice, and transmits it to the vehicle 102.

Here, "the next booking schedule" is, of the other booking schedules, the booking schedule that has the booked usage time range chronologically closest to the booked usage time range related to the booking schedule the status of which has been set to "ended".

[2.7 Usage Information Providing Unit 228]

In response to, for example, a request from a user who has transmitted a usage end notice and taken a usage end procedure, the usage information providing unit 228 transmits information on the usage of the vehicle 102 thereafter to the portable terminal of the user who has taken the usage end procedure. Usage information includes whether or not the next booked usage time range after the usage end procedure (that is, the next booking schedule) exists, whether or not the usage of a vehicle 102 related to the next booking schedule has been started, and/or whether or not door unlocking operation on the vehicle after the usage end procedure has been performed. Here, a "request from a user" mentioned above is supposed to be transmitted together with the user ID of the user, for example, from the portable terminal of the user to the usage management server 106 via, for example, a website provided by the usage management server 106.

To be specific, the usage information providing unit 228 refers to the schedule DB 252 on the basis of the user ID included in the received request from the user, and specifies, of the booking schedules that include the user ID and has the status "ended", the last (that is, the latest) booking schedule. The usage information providing unit 228 then determines whether or not the next booking schedule set to the time range after the specified booking schedule exists, and generates information on whether or not the next booking schedule exists. When the status of the next booking schedule is "started", the usage information providing unit 228 generates information indicating this fact. The usage information providing unit 228 also transmits a door unlocking history request to the vehicle 102, and acquires a door unlocking history that is the history of occurrence of door unlocking operation after the usage end procedure. The usage information providing unit 228 generates information on whether or not door unlocking operation has been performed after the usage end procedure, on the basis of the acquired door unlocking history. The usage information providing unit 228 then generates usage information including the aforementioned various types of information, and transmits the generated usage information to the portable terminal of the user who has transmitted the request.

3. CONFIGURATION OF ON-VEHICLE SYSTEM 120

Figure 3:
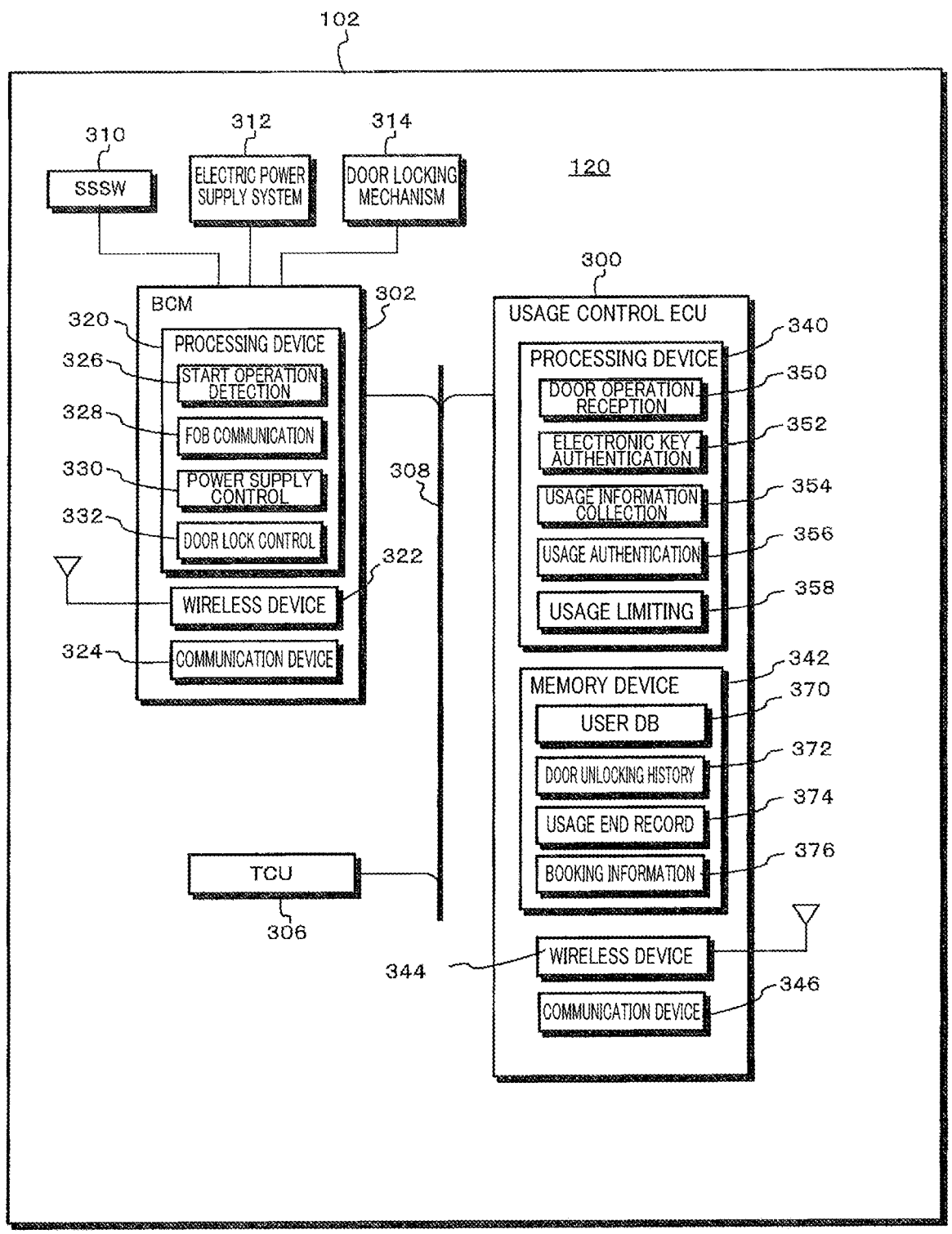
FIG. 3 is a diagram showing the configuration of an on-vehicle system in the vehicle control system shown in FIG. 1.

FIG. 3 is a diagram showing the configuration of the on-vehicle system 120 of the vehicle 102. The on-vehicle system 120 includes a usage control electronic control unit (ECU) 300, which is an electronic control unit (ECU), a body control module (BCM) 302, and a telematics control unit (TCU) 306. The usage control ECU 300, BCM 302, and TCU 306 are connected to each other via a car-mounted network bus 308 in such a manner that they can communicate with each other. Here, the car-mounted network bus 308 is, for example, a CAN bus conforming to, for example, the controller area network (CAN) communication standard.

[3.1 BCM 302]

The BCM 302 communicates with the FOB key 160 detect the presence of the FOB key 160. The BCM 302 detects operation of a vehicle actuating switch (start-stop switch (SSSW)) 310, and controls on/off of an electric power supply system 312 that supplies power to the drive motor (not shown in the drawing) or the like of the vehicle 102. The BCM 302 also controls the operation of a door locking mechanism 314 that locks and unlocks the doors of the vehicle 102.

To be specific, the BCM 302 includes a processing device 320, a wireless device 322, and a communication device 324. The wireless device 322 is a transceiver for near-field wireless communication with the FOB key 160. The communication device 324 is, for example, a CAN transceiver for communication with other devices, such as the usage control ECU 300, via, for example, the car-mounted network bus 308 serving as a CAN bus. The processing device 320 is, for example, a computer including a processor, such as a CPU. The processing device 320 may include a ROM written with programs and a RAM for temporary storage of data. The processing device 320 includes, as functional elements or functional units, a start operation detection unit 326, an FOB communication unit 328, a power supply control unit 330, and a door lock control unit 332.

The functional elements included in the processing device 320 are implemented, for example, when the processing device 320, which is a computer, executes a program. It should be noted that the computer program may be stored in an arbitrary computer-readable memory medium. Alternatively, all or part of the aforementioned functional elements in the processing device 320 may be each composed of a hardware device including one or more electronic circuit components.

[3.1.1 Start Operation Detection Unit 326]

Upon the detection that the SSSW 310 has been turned on, the start operation detection unit 326 transmits a FOB key detection request to the FOB communication unit 328. Subsequently, upon reception of a FOB detection notice that indicates the fact that a FOB key 160 has been detected, from the FOB communication unit 328, the start operation detection unit 326 transmits a vehicle start request to the power supply control unit 330.

In contrast, upon reception of a FOB non-detection notice that indicates the fact that a FOB key 160 was not detected, from the FOB communication unit 328, the start operation detection unit 326 transmits a vehicle start authentication request to the usage control ECU 300. The reason why a vehicle start authentication request is transmitted to the usage control ECU 300 in the case of FOB non-detection is because the wireless device 322 cannot communicate with the portable terminal 142 or the like but only with the FOB key 160. The start operation detection unit 326 transmits a vehicle start authentication request to the usage control ECU 300, and commissions the usage control ECU 300 to authenticate whether or not the key code of a portable terminal present in the vehicle has the authority to start the vehicle.

The usage control ECU 300 acquires the key code from the portable terminal present in the vehicle interior as described later, and when the acquired key code is a valid key code that has the authority to start the vehicle, sends back a vehicle start authentication result notice that indicates the fact that the vehicle start authentication has succeeded. Upon reception of the vehicle start authentication result notice that indicates the fact that the vehicle start authentication has succeeded from the usage control ECU 300, the start operation detection unit 326 transmits a vehicle start request to the power supply control unit 330.

Upon the detection that the SSSW 310 has been turned off, the start operation detection unit 326 transmits a vehicle stop request to the power supply control unit 330.

[3.1.2 FOB Communication Unit 328]

In response to the reception of a door unlocking request including a key code 150 from the FOB key 160, the FOB communication unit 328 checks the key code 150 included in the door unlocking request against the authentication key code stored in the FOB communication unit 328. If the key code 150 included in the door unlocking request matches the stored authentication key code, the FOB communication unit 328 transmits a door lock release command including the key code 150 included in the door unlocking request to the door lock control unit 332.

In response to the reception of a door locking request including a key code 150 from the FOB key 160, the FOB communication unit 328 checks the key code 150 included in the door locking request against the authentication key code stored in the FOB communication unit 328. If the key code 150 included in the door locking request matches the stored authentication key code, the FOB communication unit 328 transmits a door lock setting command to the door lock control unit 332.

In response to the reception of the FOB key detection request from the start operation detection unit 326, the FOB communication unit 328 attempts to search for a FOB key 160 that can be present in the vehicle interior. The FOB communication unit 328 can receive a key code 150 from the FOB key 160 and, when the key code 150 matches the authentication key code, transmits a FOB detection notice including the key code 150, which has been received from the FOB key 160, to the start operation detection unit 326. When detection of a FOB key 160 is not performed (when communication is unavailable) or when the key code received from the FOB key 160 does not match the authentication key code, the FOB communication unit 328 transmits a FOB non-detection notice to the start operation detection unit 326.

[3.1.3 Power Supply Control Unit 330]

Upon reception of a vehicle start request from the start operation detection unit 326, the power supply control unit 330 turns on the operation of the electric power supply system 312. Hence, the electric power supply system 312 starts to supply power to the drive motor (not shown in the drawings) or the like of a vehicle 102, thereby starting the vehicle 102. Upon reception of a vehicle stop request from the start operation detection unit 326, the power supply control unit 330 turns off the operation of the electric power supply system 312.

[3.1.4 Door Lock Control Unit 332]

When receiving a door lock release command from the FOB communication unit 328 or the usage control ECU 300, the door lock control unit 332 releases the door lock by actuating the door locking mechanism 314. When releasing the door lock according to a door lock release command from the FOB communication unit 328, the door lock control unit 332 transmits an FOB unlock notice that indicates the fact that door unlocking by the FOB key 160 has been performed to the usage control ECU 300. When releasing the door lock according to a door lock release command from the usage control ECU 300, the door lock control unit 332 transmits a door unlocking notice including a schedule ID included in the door lock release command to the usage control ECU 300.

When receiving a door lock setting command from the FOB communication unit 328 or the usage control ECU 300, the door lock control unit 332 sets door lock (i.e., locks the doors) by actuating the door locking mechanism 314.

[3.2 Usage Control ECU 300]

The usage control ECU 300 determines whether to permit the operation that a user performs using an electronic key to use a vehicle 102, and transmits information on the determination result to the BCM 302. To be specific, in response to the reception of a door lock release request including a key code from a user's portable terminal, the usage control ECU 300 performs authentication of the key code and determines whether or not the key code has the authority to unlock the doors. If the key code has the authority to unlock the doors, the usage control ECU 300 instructs the BCM 302 to release door lock.

In response to the reception of an electronic key authentication request from the BCM 302, the usage control ECU 300 acquires a key code from a portable terminal present in the vehicle interior and performs authentication of the key code. The usage control ECU 300 determines whether the key code has the authority to start the vehicle. The usage control ECU 300 then transmits an electronic key authentication result notice including the determination result to the BCM 302.

Referring to FIG. 3, the usage control ECU 300 includes a processing device 340, a memory device 342, a wireless device 344, and a communication device 346. The processing device 340 regularly downloads the user DB 250 included in the usage management server 106 and the memory device 342 stores it as a user database (user DB) 370. The memory device 342 also stores a door unlocking history 372, a usage end history 382, and booking information 376 through the processing device 340.

The wireless device 344 is a transceiver for near-field wireless communication with the vehicle interior of a vehicle 102 or a portable terminal nearby, and conforms to, for example, the Bluetooth (registered trademark) communication standard. The wireless device 344 attempts to perform pairing when there is a portable terminal near the vehicle, and establishes communication with the portable terminal.

The communication device 346 is, for example, a CAN transceiver for communication with the BCM 302 or other devices via, for example, the car-mounted network bus 308 serving as a CAN bus.

The processing device 340 is, for example, a computer including a processor, such as a CPU. The processing device 340 may include a ROM written with programs and a RAM for temporary storage of data. The processing device 340 includes, as functional elements or functional units, a door operation reception unit 350, an electronic key authentication unit 352, a usage information collection unit 354, a usage authentication unit 356, and a usage limiting unit 358.

The functional elements included in the processing device 340 are implemented, for example, when the processing device 340, which is a computer, executes a program. It should be noted that the computer program may be stored in an arbitrary computer-readable memory medium.

[3.2.1 Door Operation Reception Unit 350]

In response to the reception of a door unlocking request including a key code from a portable terminal near a vehicle 102, the door operation reception unit 350 transmits a door unlocking authentication request including the key code included in the door unlocking request to the electronic key authentication unit 352, and makes an inquiry about whether the key code has the authority to unlock the doors. Upon reception of a door unlocking authentication result notice indicating the fact that the door unlocking authentication has succeeded and the key code has the authority to unlock the doors from the electronic key authentication unit 352, the door operation reception unit 350 extracts a schedule ID from the key code included in the door unlocking request and transmits a door lock release command including the schedule ID to the BCM 302. Hence, the door operation reception unit 350 actuates the door locking mechanism 314 of the BCM 302 to release the door lock.

In response to the reception of a door locking request including a key code from a portable terminal near a vehicle 102, the door operation reception unit 350 transmits a door locking authentication request including the key code included in the door locking request to the electronic key authentication unit 352, and makes an inquiry about whether the key code has the authority to lock the doors. Upon reception of a door locking authentication result notice indicating the fact that the door locking authentication has succeeded and the key code has the authority to lock the doors from the electronic key authentication unit 352, the door operation reception unit 350 extracts a schedule ID from the key code included in the door locking request and transmits a door lock command including the schedule ID to the BCM 302. Hence, the door operation reception unit 350 actuates the door locking mechanism 314 of the BCM 302 to lock the doors.

[3.2.2 Electronic Key Authentication Unit 352]

The electronic key authentication unit 352 communicates with the usage management server 106 via a TCU 306 at predetermined intervals and downloads the contents of the user DB 250. The electronic key authentication unit 352 saves the downloaded contents of the user DB 250, as the user DB 370, to the memory device 342.

Upon reception of a door unlocking authentication request from the door operation reception unit 350, the electronic key authentication unit 352 performs unlock authentication processing on the key code included in the door unlocking authentication request. In the unlock authentication processing, the electronic key authentication unit 352 determines whether electronic key basic information in the target key code matches any of the pieces of electronic key basic information saved to the user DB 370 stored in the memory device 342. If they match, the electronic key authentication unit 352 transmits an unlock authority confirmation request, including the key code, for making an inquiry about whether or not the key code has the authority to unlock the doors, to the usage authentication unit 356.

Upon reception of a response indicating the fact that the key code has the authority to unlock the doors from the usage authentication unit 356 or the usage limiting unit 358, the electronic key authentication unit 352 transmits a door unlocking authentication result notice indicating the fact that the door unlocking authentication has succeeded to the door operation reception unit 350.

Upon reception of a door locking authentication request from the door operation reception unit 350, the electronic key authentication unit 352 performs lock authentication processing on the key code included in the door locking authentication request. In the lock authentication processing, the electronic key authentication unit 352 determines whether electronic key basic information in the target key code matches any of the pieces of electronic key basic information saved to the user DB 370 stored in the memory device 342. If they match, the electronic key authentication unit 352 transmits a lock authority confirmation request, including the key code, for making an inquiry about whether or not the key code has the authority to lock the doors, to the usage authentication unit 356.

Upon reception of a response indicating the fact that the key code has the authority to lock the doors from the usage authentication unit 356 or the usage limiting unit 358, the electronic key authentication unit 352 transmits a door locking authentication result notice indicating the fact that the door locking authentication has succeeded to the door operation reception unit 350.

Upon reception of a vehicle start authentication request from the BCM 302, the electronic key authentication unit 352 performs start authentication processing on the key code included in the vehicle start authentication request. In the start authentication processing, the electronic key authentication unit 352 determines whether electronic key basic information in the target key code matches any of the pieces of electronic key basic information saved to the user DB 370 stored in the memory device 342. If they match, the electronic key authentication unit 352 transmits a start authority confirmation request, including the key code, for making an inquiry about whether or not the key code has the authority to start the vehicle, to the usage authentication unit 356.

Upon reception of a response indicating the fact that the key code has the authority to start the vehicle from the usage authentication unit 356, the electronic key authentication unit 352 transmits a vehicle start authentication result notice indicating the fact that the vehicle start authentication has succeeded to the BCM 302.

[3.2.3 Usage Information Collection Unit 354]

Upon reception of a door unlocking notice from the BCM 302, the usage information collection unit 354 adds, as a door unlocking record, the reception time and the schedule ID included in the door unlocking notice to the door unlocking history 372 stored in the memory device 342, and saves it. Upon reception of an FOB unlock notice from the BCM 302, the usage information collection unit 354 adds, as a door unlocking record, information indicating the fact that the FOB unlock notice has been received, together with the related reception time to the door unlocking history 372, and saves it.

Upon reception of a usage time end notice from the usage management server 106, the usage information collection unit 354 deletes the contents of the door unlocking history 372 stored in the memory device 342. Accordingly, only the history of the door unlocking operation of the vehicle 102 after the most recently performed usage end procedure is saved to the door unlocking history 372. The usage information collection unit 354 saves the schedule ID included in the received usage time end notice, to the usage end record 374 stored in the memory device 342.

Moreover, if the received usage time end notice includes information on the schedule ID of the next booking schedule and the booked usage time range, the usage information collection unit 354 saves this information on the schedule ID and the booked usage time range to the booking information 376 stored in the memory device 342.

When receiving a door unlocking notice from the BCM 302, if the schedule ID included in the received door unlocking notice matches the schedule ID saved to the booking information 376 (i.e., upon start of the usage of the vehicle 102 for the next booking schedule), the usage information collection unit 354 transmits a usage start notice including the schedule ID to the usage management server 106. Through reception of the usage start notice, the usage management server 106 detects the start of the usage related to the next usage schedule.

Upon transmission of the usage start notice, the usage information collection unit 354 deletes the contents of the usage end record 374 and the booking information 376. Thus, information on the immediately preceding booking schedule held in the usage end record 374 and the booking information 376 after a usage end procedure is reset upon the start of the usage of the vehicle 102 related to the next booking schedule.

Upon reception of a door unlocking history request from the usage management server 106, the usage information collection unit 354 transmits, as a door unlocking history, the contents of the door unlocking history 372 stored in the memory device 342 to the usage management server 106.

[3.2.4 Usage Authentication Unit 356]

Upon reception of an unlock authority confirmation request from the electronic key authentication unit 352, the usage authentication unit 356 extracts a schedule ID and the start date and time and end date and time of a booked usage time range from a key code included in the unlock authority confirmation request. If the same schedule ID as the extracted schedule ID is not saved to the usage end record 374 stored in the memory device 342 and the current time is within the extracted booked usage time range, the usage authentication unit 356 determines that the key code has the authority to unlock the doors. In other words, if the extracted schedule ID is not the schedule ID of any booking schedule that has already been subject to a usage end procedure and the current time is within the booked usage time range, the usage authentication unit 356 determines that the key code has the authority to unlock the doors. The usage authentication unit 356 then transmits a response indicating the fact that the key code has the authority to unlock the doors to the electronic key authentication unit 352.

In the case of the usage of a vehicle 102 within a booked usage time range, the user may be permitted to unlock the doors shortly before the booked usage time range. In this case, if the extracted schedule ID does not correspond to any schedule ID that has already been subject to a usage end procedure and the current time is within the extracted booked usage time range or within the immediately preceding time period of a predetermined length, the usage authentication unit 356 determines that the key code has the authority to unlock the doors.

In contrast, if the same schedule ID as the extracted schedule ID is saved to the usage end record 374, that is, if a usage end procedure for the booked usage time range indicated by that key code has already been carried out, the usage authentication unit 356 transmits the received unlock authority authentication request to the usage limiting unit 358. In other words, of the received unlock authority authentication requests, for unlock authority authentication requests related to door unlocking requests using key codes for which usage has ended through a usage end procedure, the usage authentication unit 356 commissions the usage limiting unit 358 to determine whether or not the key code has the authority to unlock the doors.

Upon reception of a lock authority confirmation request from the electronic key authentication unit 352, the usage authentication unit 356 extracts a schedule ID and the start date and time and end date and time of a booked usage time range from a key code included in the lock authority confirmation request. If the same schedule ID as the extracted schedule ID is not saved to the usage end record 374 stored in the memory device 342 and the current time is within the extracted booked usage time range, the usage authentication unit 356 determines that the key code has the authority to lock the doors.

Even if the same schedule ID as the extracted schedule ID is saved to the usage end record 374, when the extracted schedule ID is included in the last door unlocking record recorded in the door unlocking history 372, the usage authentication unit 356 determines that the key code has the authority to lock the doors. Accordingly, with the key code, door unlocking is permitted by the usage limiting unit 358, which will be described later, after the end of usage, and even when door unlocking is performed using the key code, locking using that key code is permitted.

When it is determined that the key code has the authority to lock the doors, the usage authentication unit 356 transmits a response indicating the fact that the key code has the authority to lock the doors, to the electronic key authentication unit 352.

Upon reception of a start prohibition command, which will be described later, from the usage limiting unit 358, the usage authentication unit 356 stores the start prohibition command, for example, in the memory device 342.

Upon reception of a start authority confirmation request from the electronic key authentication unit 352, the usage authentication unit 356 extracts a schedule ID and the start date and time and end date and time of a booked usage time range from a key code included in the start authority confirmation request. Subsequently, the usage authentication unit 356 determines whether a start prohibition command including the same schedule ID as the extracted schedule ID has been received from the usage limiting unit 358. If it has been received, the usage authentication unit 356 then transmits a response indicating the fact that the key code does not have the authority to start the vehicle to the electronic key authentication unit 352.

In contrast, if no start prohibition command including the same schedule ID as the extracted schedule ID has been received, the usage authentication unit 356 determines that the key code has the authority to start the vehicle, provided that the same schedule ID as the extracted schedule ID is not saved to the usage end record 374 stored in the memory device 342 and the current time is within the extracted booked usage time range. The usage authentication unit 356 then transmits a response indicating the fact that the key code has the authority to start the vehicle to the electronic key authentication unit 352.

If the same schedule ID as the extracted schedule ID is saved to the usage end record 374 or the current time is out of the extracted booked usage time range, the usage authentication unit 356 determines that the key code does not have the authority to start the vehicle. The usage authentication unit 356 then transmits a response indicating the fact that the key code does not have the authority to start the vehicle to the electronic key authentication unit 352.

[3.2.5 Usage Limiting Unit 358]

After a usage end procedure, upon reception of a door unlocking request related to a vehicle 102 using a key code for which usage has ended through the usage end procedure, the usage limiting unit 358 determines whether to permit door unlocking in relation to the door unlocking request, according to the condition A or B.

To be specific, the usage limiting unit 358 determines whether to permit vehicle 102's door unlocking depending on whether or not another booked usage time range exists after one booked usage time range for which the usage end procedure was performed, or whether vehicle 102's door unlocking that does not use the key code that was issued for the one booked usage time range was performed during the period from the end of the usage end procedure to the current time.

Here, the condition A corresponds to the determination based on whether the other booked usage time range exists after one booked usage time range for which the usage end procedure was performed. The condition B corresponds to the determination based on whether vehicle 102's door unlocking that does not use the electronic key that was issued for the one booked usage time range was performed during the period from the end of the usage end procedure to the current time. In this embodiment, the usage limiting unit 358 refers to, for example, a condition selection flag saved to the memory device 342 to select one of the above-mentioned conditions to determine whether to permit door unlocking, according to the value of the condition selection flag.

In this embodiment, in particular, in the case where the determination based on whether or not the other booked usage time range exists is selected according to the condition selection flag, after a usage end procedure for one booked usage time range and until the start of the other booked usage time range subsequent to the one booked usage time range, the usage limiting unit 358 permits door unlocking for a door unlocking request using a key code that was issued in relation to the one booked usage time range (that is, a key code for which usage has ended through the usage end procedure).

In the case where the determination based on whether door unlocking was performed during the period from the end of the usage end procedure to the current time is selected according to the condition selection flag, after a usage end procedure for one booked usage time range and until unlocking of the doors of the vehicle 102 that does not use a key code that was issued in relation to the one booked usage time range during the period from the end of the usage end procedure to the current time (that is, a key code for which usage has ended through the usage end procedure), the usage limiting unit 358 permits door unlocking for a door unlocking request using a key code that was issued in relation to the one booked usage time range.

To be more specific, the usage limiting unit 358 receives, via the usage authentication unit 356, an unlock authority confirmation request related to the door unlocking request that was made using the key code for which usage has ended through the usage end procedure.

In response to the reception of the unlock authority confirmation request, the usage limiting unit 358 refers to the condition selection flag saved to the memory device 342. If the value of the condition selection flag is "1", the usage limiting unit 358 refers to the booking information 376 to determine whether or not the next booked usage time range is set to the time range subsequent to the booked usage time range in which the usage end procedure was performed. If it is set there, whether or not the next booked usage time range has been started is determined according to the current time. If it has been started, it is determined that door unlocking is not permitted. In contrast, if the next booked usage time range is not set or if the next booked usage time range has not been started, the usage limiting unit 358 determines to permit door unlocking.

If the value of the condition selection flag saved to the memory device 342 is "2", the usage limiting unit 358 refers to the door unlocking history 372 to determine whether or not the door unlocking history 372 includes at least one door unlocking record. If the door unlocking history 372 includes no door unlocking record, the usage limiting unit 358 determines to permit the door unlocking, and if the door unlocking history 372 includes at least one door unlocking record, determines not to permit the door unlocking.

When determining to permit door unlocking, the usage limiting unit 358 then transmits a response indicating the fact that the key code included in the unlock authority confirmation request has the authority to unlock the doors to the electronic key authentication unit 352. In contrast, when determining not to permit door unlocking, the usage limiting unit 358 then transmits a response indicating the fact that the key code does not have the authority to unlock the doors to the electronic key authentication unit 352.

When determining to permit door unlocking, the usage limiting unit 358 transmits a start prohibition command including the schedule ID indicated by the key code included in the unlock authority confirmation request to the usage authentication unit 356. Accordingly, after the doors are unlocked according to the permission of the door unlocking, the usage limiting unit 358 prevents the vehicle from being started using the key code.

4. PROCESSING IN VEHICLE CONTROL SYSTEM 100

Figure 7:
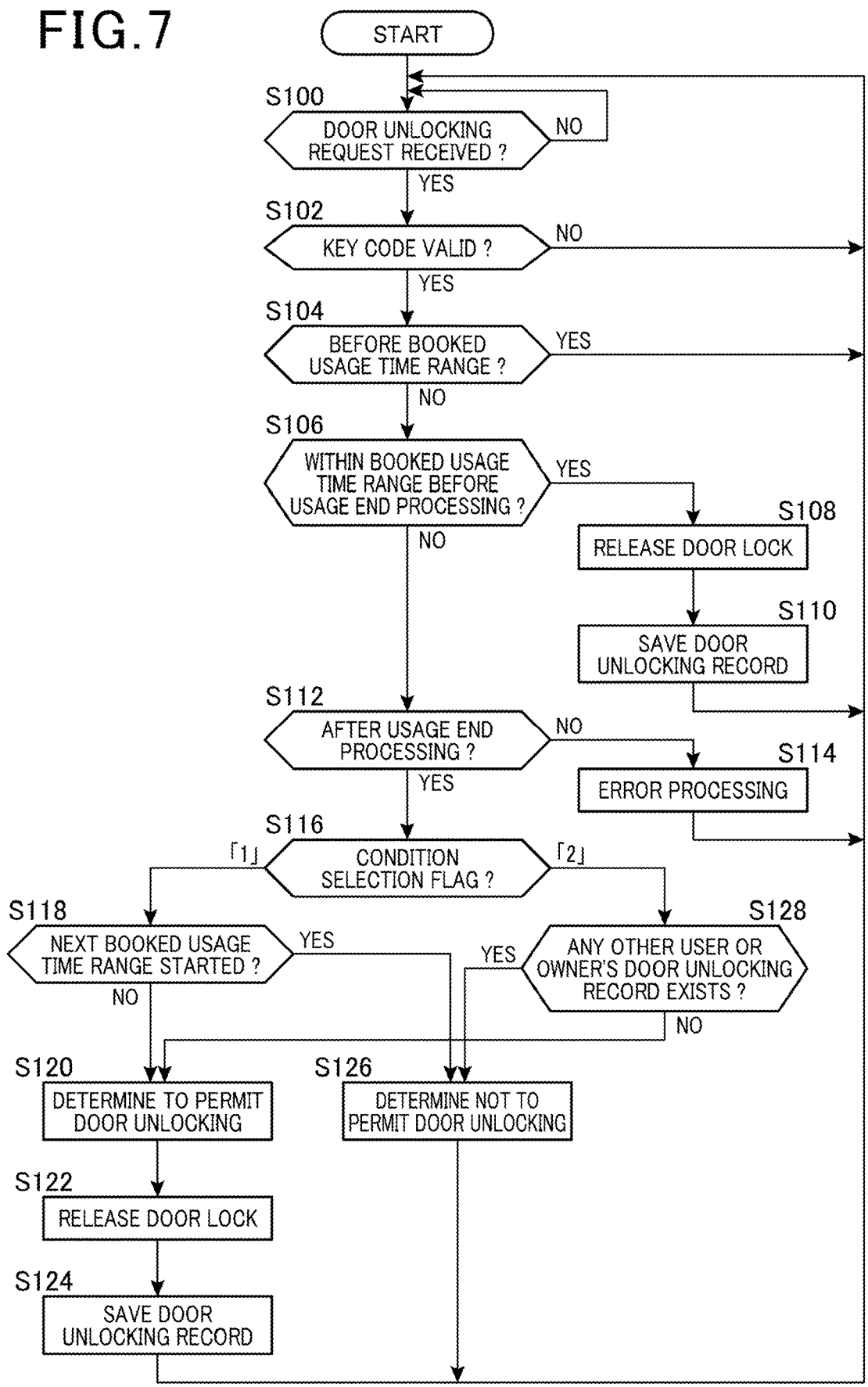
FIG. 7 is a flow chart showing a procedure of processing taken by the vehicle control system shown in FIG. 1 upon reception of a door unlocking request from a portable terminal of a user.

Processing performed in the on-vehicle system 120 of the vehicle control system 100 and related to a door unlocking request for a vehicle 102 received from a user's portable terminal will now be explained using the flow chart of FIG. 7. This processing starts when the power source of the BCM 302 and the usage control ECU 300 is turned on, and ends when it is turned off. It should be noted that the power source of the BCM 302 and the usage control ECU 300 is turned on, for example, when the vehicle 102 is shipped from the factory, and is kept on even after the SSSW 310 of the vehicle 102 is turned off.

Upon start of the processing, the door operation reception unit 350 of the usage control ECU 300 included in the on-vehicle system 120 determines whether or not a door unlocking request has been received from the user's portable terminal (S100). When not receiving a door unlocking request (S100, NO), the door operation reception unit 350 returns to Step S100 and is kept on standby until it receives a door unlocking request. As described above, this door unlocking request includes a key code held in a source portable terminal.

In contrast, upon reception of a door unlocking request (S100, YES), the door operation reception unit 350 extracts the key code included in the received door unlocking request, and transmits the door unlocking authentication request including this key code to the electronic key authentication unit 352. Hence, the electronic key authentication unit 352 authenticates whether or not the key code included in the door unlocking request is valid (S102). To be specific, the electronic key authentication unit 352 refers to the user DB 370 stored in the memory device 342, and determines whether or not the electronic key basic information in the key code matches the electronic key basic information associated with any of the user IDs stored in the user DB 370. If they match, the electronic key authentication unit 352 determines that this key code is valid.

If the key code included in the door unlocking request is not valid (S102, NO), the on-vehicle system 120 returns to Step S100 and is kept on standby until it receives another door unlocking request. In contrast, if the key code included in the door unlocking request is valid (S102, YES), the electronic key authentication unit 352 transmits the unlock authority confirmation request including the key code (that is, the key code that was included in the door unlocking request) to the usage authentication unit 356. The usage authentication unit 356 receives the unlock authority confirmation request, and according to the key code included in the unlock authority request, determines whether or not the door unlocking request that was received in Step S100 is a door unlocking request made before the booked usage time range (S104).

To be specific, the usage authentication unit 356 extracts a schedule ID and information on the booked usage time range from the key code included in the received unlock authority confirmation request. If the current time is before the start time of the extracted booked usage time range, the usage authentication unit 356 determines that the door unlocking request is a door unlocking request made before the booked usage time range. If not, the usage authentication unit 356 determines that the door unlocking request is a door unlocking request made after the booked usage time range.

If the received door unlocking request is a door unlocking request before the booked usage time range (S104, YES), the usage authentication unit 356 returns the processing to Step S100 without releasing door lock. To be specific, the usage authentication unit 356 transmits a response indicating the fact that the key code included in the door unlocking request does not have the authority to unlock the doors to the electronic key authentication unit 352. Upon reception of the response, the electronic key authentication unit 352 transmits a door unlocking authentication result notice indicating the fact that the door unlocking authentication has failed to the door operation reception unit 350. Accordingly, the door operation reception unit 350 does not transmit a door lock release command to the BCM 302 and, therefore, the door lock control unit 332 does not release door lock.

In contrast, if the received door unlocking request is a door unlocking request made after the start of the booked usage time range (S104, NO), the usage authentication unit 356 determines whether or not the received door unlocking request is a door unlocking request made in a booked usage time range before the usage end procedure (that is, in the booked usage time range of a booking schedule for which a usage end procedure has yet to be performed) (S106).

To be specific, the usage authentication unit 356 further extracts a schedule ID from the key code included in the received unlock authority confirmation request. If the extracted schedule ID does not match the schedule ID stored in the usage end record 374 stored in the memory device 342, and the current time is in the extracted booked usage time range, the usage authentication unit 356 determines that the door unlocking request is a door unlocking request made in a booked usage time range before the usage end procedure. In contrast, if the extracted schedule ID matches the schedule ID stored in the usage end record 374, or the current time is out of the extracted booked usage time range, the usage authentication unit 356 determines that the door unlocking request is not a door unlocking request made in a booked usage time range before the usage end procedure.

If the door unlocking request is a door unlocking request made in a booked usage time range before the usage end procedure (S106, YES), the door lock control unit 332 of the BCM 302 releases door lock (S108). To be specific, the usage authentication unit 356 transmits a response indicating the fact that the key code included in the door unlocking request has the authority to unlock the doors to the electronic key authentication unit 352. Upon reception of the response, the electronic key authentication unit 352 transmits a door unlocking authentication result notice indicating the fact that the door unlocking authentication has succeeded to the door operation reception unit 350. Upon reception of the door unlocking authentication result notice, the door operation reception unit 350 extracts a schedule ID from the key code included in the door unlocking request and transmits a door lock release command including the schedule ID to the BCM 302. Hence, the door lock control unit 332 of the BCM 302 actuates the door locking mechanism 314 to release door lock. The door lock control unit 332 also transmits a door unlocking notice including the schedule ID to a usage information collection unit 354.

Subsequently, the usage information collection unit 354 receives a door unlocking notice transmitted from the door lock control unit 332, and adds and saves a door unlocking record to the door unlocking history 372 (S110). To be specific, the usage information collection unit 354 saves the schedule ID included in the door unlocking notice together with the reception time of the door unlocking notice, to the door unlocking history 372. Afterwards, the on-vehicle system 120 returns to Step S100 and repeats the processing.

In contrast, if the door unlocking request is not a door unlocking request made in a booked usage time range before the usage end procedure, that is, if it is after the usage end procedure or it is before the usage end procedure and after the booked usage time range in Step S106 (S106, NO), the usage authentication unit 356 determines whether or not the door unlocking request that was received in Step S100 is a door unlocking request made after the usage end procedure (S112). To be specific, if the schedule ID extracted from the key code included in the received unlock authority confirmation request (that is, the key code that was included in the door unlocking request) matches the schedule ID stored in the usage end record 374, the usage authentication unit 356 determines that the door unlocking request is for door unlocking after the usage end procedure.

If the door unlocking request is not for door unlocking after the usage end procedure, that is, if the key unlock request is a door unlocking request made at a time before the usage end procedure and after the booked usage time range (S112, NO), the vehicle 102 is in use after the expiration of the booked usage time range and, therefore, the usage authentication unit 356 performs predetermined error processing (S114), and returns the processing to Step S100. This error processing involves, for example, transmitting an alarm indicating the fact that the vehicle 102 is in use after the expiration of the booked usage time range, to the usage management server 106, and receiving, from the usage management server 106, an instruction indicating whether or not the doors can be unlocked.

In contrast, if the door unlocking request is for door unlocking after the usage end procedure (S112, YES), the usage authentication unit 356 transmits the received unlock authority authentication request to the usage limiting unit 358. Receiving the unlock authority authentication request, the usage limiting unit 358 refers to a condition selection flag saved to the memory device 342 to determine whether to permit door unlocking, using a condition according to the value of the condition selection flag.

In particular, if the condition selection flag is "1" (S116, "1"), the usage limiting unit 358 determines whether or not the next booked usage time range subsequent to the booked usage time range in which a usage end procedure was performed has started (S118). To be specific, the usage limiting unit 358 refers to the booking information 376 stored in the memory device 342, and if the booking information 376 has the next booked usage time range, determines whether or not the scheduled start time of the usage has come, referring to the current time. If it has come, the usage limiting unit 358 determines that the next booked usage time range has started. In contrast, if the scheduled start time of the usage has not come or if the booking information 376 does not have the next booked usage time range, it is determined that the next booked usage time range has not started.

If any other booked usage time range has not started (S118, NO), the usage limiting unit 358 determines to permit door unlocking (S120) and unlocks the doors through the door lock control unit 332 of the BCM 302 (S122). To be specific, the usage limiting unit 358 then transmits a response indicating the fact that the key code has the authority to unlock the doors to the electronic key authentication unit 352. Upon reception of the response, the electronic key authentication unit 352 transmits a door unlocking authentication result notice indicating the fact that the door unlocking authentication has succeeded to the door operation reception unit 350. Upon reception of the door unlocking authentication result notice, the door operation reception unit 350 extracts a schedule ID from the key code included in the door unlocking request and transmits a door lock release command including the schedule ID to the BCM 302. Hence, the door lock control unit 332 of the BCM 302 actuates the door locking mechanism 314 to release door lock.

Subsequently, the usage information collection unit 354 receives a door unlocking notice transmitted from the door lock control unit 332, and adds a door unlocking record to the door unlocking history 372 (S124). To be specific, the usage information collection unit 354 saves the schedule ID included in the door unlocking notice together with the reception time of the door unlocking notice, to the door unlocking history 372. Afterwards, the on-vehicle system 120 returns to Step S100 and repeats the processing.

In contrast, if the next booked usage time range has started in Step S118 (S118, YES), the usage limiting unit 358 determines not to permit door unlocking (S126) and transmits a response indicating the fact that the key code does not have the authority to unlock the doors to the electronic key authentication unit 352. Accordingly, a door lock release command is not transmitted from the electronic key authentication unit 352 to the BCM 302, so that door unlocking is not performed. Afterwards, the on-vehicle system 120 returns to Step S100 and repeats the processing.

In contrast, if the condition selection flag is "2" in Step S116 (S116, "2"), determination is made of whether the owner 130 or another user different from the user, who performed the usage end procedure within the time from the end of the usage end procedure to the current time, has left a record of door unlocking (S128). To be specific, the usage limiting unit 358 refers to the door unlocking history 372 stored in the memory device 342. If no door unlocking record is saved to the door unlocking history 372, the usage limiting unit 358 determines that door unlocking by any other users or the owner 130 is not occurring. If at least one door unlocking record is saved, the usage limiting unit 358 determines that door unlocking by another user or the owner 130 is occurring.

If there is any record of door unlocking by another user or the owner 130 (S128, YES), the usage limiting unit 358 forwards the processing to Step S120 and determines to permit door unlocking (S120) and, if not, (S128, NO), the usage limiting unit 358 moves the processing to Step S126 and determines not to permit door unlocking.

5. CONCLUSION

As described above, a vehicle control system 100 of this embodiment is a system that controls the operation of a vehicle used by a plurality of users and includes a schedule management unit 222 for managing the time range of booked usage of a vehicle 102 by the user 132 or the like. The vehicle control system 100 includes a portable terminal 142 or the like which is an information medium to hold an electronic key 152 or the like that is issued in relation to a booked usage time range and enables usage of a vehicle 102 in the booked usage time range, and a usage end detection unit 226 that detects execution of a usage end procedure for the vehicle in the booked usage time range. The vehicle control system 100 also includes a usage limiting unit 358 that determines whether to permit vehicle 102's door unlocking that is performed after a usage end procedure and uses an electronic key 152 or the like. The vehicle control system 100 also includes a door lock control unit 332 that is a door unlocking unit for unlocking the doors of a vehicle 102 in response to a door unlocking request made using an electronic key 152 or the like, provided that the usage limiting unit 358 determines to permit vehicle 102's door unlocking. The usage limiting unit 358 determines whether to permit vehicle 102's door unlocking depending on whether or not another booked usage time range exists after one booked usage time range for which the usage end procedure was performed, or whether vehicle 102's door unlocking that does not use an electronic key 152 or the like that was issued for the one booked usage time range was performed during the period from the end of the usage end procedure to the current time.

This configuration can improve user's convenience by enabling access to the vehicle interior after a usage end procedure regardless of the position of a vehicle 102 while considering use of the vehicle 102 by other users and the owner 130.

In the vehicle control system 100, after a usage end procedure for one booked usage time range and until the start of the other booked usage time range subsequent to the one booked usage time range, the usage limiting unit 358 permits door unlocking for the door unlocking request using an electronic key 152 or the like that was issued in relation to the one booked usage time range.

With this system, without preventing the actual usage of the vehicle 102 by another user and the owner 130 after a usage end procedure, a limitation on the access to the vehicle interior after the usage end procedure is significantly relaxed, thereby significantly improving user's convenience.

In the vehicle control system 100, after a usage end procedure for one booked usage time range, during the period from the end of the usage end procedure to the current time, until the doors of a vehicle 102 are unlocked without an electronic key 152 or the like that was issued in relation to the one booked usage time range, the usage limiting unit 358 permits door unlocking for a door unlocking request using an electronic key 152 or the like that was issued in relation to the one booked usage time range.

This configuration can improve user's convenience by relaxing a limitation on the access to the vehicle interior after a usage end procedure regardless of whether or not another booked usage time range is set, without preventing use of a vehicle 102 by other users and the owner 130.

Further, in the vehicle control system 100, after a usage end procedure related to one booked usage time range, when permitting door unlocking made according to a door unlocking request using, for example, an electronic key 152 or the like that was issued in relation to the one booked usage time range, the usage limiting unit 358 prohibits a vehicle 102 from being started using the electronic key 152 or the like.

With this configuration, a limitation on the access to the vehicle interior after a usage end procedure can be relaxed and user's convenience can be improved, which prevents unscheduled improper travel of a vehicle 102 and improves security.

In addition, the vehicle control system 100 further includes a usage information providing unit 228 that notices, after a usage end procedure related to one booked usage time range, the portable terminal 142 or the like, which is a communication terminal of a user 132 or the like who has taken the usage end procedure, of whether or not another booked usage time range exists and/or whether vehicle 102's unlocking operation occurred after the usage end procedure.

With this configuration, the user who has taken the usage end procedure can easily determine whether or not he can access to the vehicle interior of the vehicle 102 thereafter on the basis of the information notified to his portable terminal, so that he can speedily take appropriate action.

6. MODIFICATION

It should be noted that the present invention is not limited to the configuration of the aforementioned embodiment, and can be implemented in a variety of modes without departing from the scope of the present invention.

For example, when issuing a key code that is valid in a booked usage time range, the usage management server 106 puts information on the usage time range in the key code in this embodiment, however, this is not necessarily the case. The usage management server 106 may generate key codes that only have electronic key basic information. In this case, for example, for a key code that was used for a vehicle 102, the usage authentication unit 356 of the on-vehicle system 120 and the usage limiting unit 358 make an inquiry of the usage management server 106 about a schedule ID assigned to the key code, a booked usage time range, and the like, thereby executing the aforementioned processing.

Further, the usage authentication unit 356 and the usage limiting unit 358 are provided to the on-vehicle system 120 in this embodiment, however, this is not necessarily the case. The functions of the usage authentication unit 356 and/or the usage limiting unit 358 may be implemented in, for example, the processing device 200 of the usage management server 106. In this case, for example, the usage control ECU 300 of the on-vehicle system 120 communicates with the usage management server 106 through the TCU 306, thereby transmitting information, for example, on a key code that was used for a vehicle 102, door unlocking, and the like to the usage management server 106, and receiving instructions of whether to permit door unlocking and/or whether to permit the vehicle to be started, from the usage management server 106.

In this embodiment, the user 132 or the like downloads an electronic key 152 or the like that was issued by the usage management server 106 in his portable terminal 142 or the like for use so that he can use the vehicle 102, however, this is not necessarily the case. For example, the usage management server 106 or the like may issue, for each user, a memory to which information on the user ID of the user is saved or an information medium (for example, a card key or a member card) provided with a magnetic recording portion.

In this case, the vehicle 102 receives, for example, a booking schedule from the usage management server 106. When, for example, the user holds the information medium above a reading device provided on the inner side of a window of the vehicle 102, the door operation reception unit 350 can acquire a user ID from the information medium, and the usage authentication unit 356 and the usage limiting unit 358 can determine whether to permit door unlocking on the basis of the acquired user ID and the received booking schedule. In other words, in this case, the user ID stored in an information medium, such as a card key or member card, corresponds to a substantial electronic key that enables the usage of the vehicle 102 in the booked usage time range, and the information medium, such as a card key or member card, corresponds to an information medium that holds an electronic key that enables the usage of the vehicle 102 in the booked usage time range.

In this case, a lockbox containing a vehicle 102's key (for example, a FOB key) is provided in the vehicle 102 in advance, and the box can be unlocked when the usage authentication unit 356 determines that the information medium has the authority to start the vehicle. When the usage limiting unit 358 determines to permit door unlocking after a usage end procedure and transmits a vehicle 102's start prohibition command to the usage authentication unit 356, the usage authentication unit 356 locks the box or leaves the box locked, thereby preventing the vehicle from being started.

REFERENCE SIGNS LIST

100 Vehicle control system, 102 Vehicle, 104 Network, 106 Usage management server, 120 On-vehicle system, 130 Owner, 132, 134, 136 User, 142, 144, 146 Portable terminal, 150, 152, 154, 156 Electronic key (key code), 160 FOB key, 200, 320, 340 Processing device, 202, 342 Memory device, 204, 324, 346 Communication device, 220 User registration unit, 222 Schedule management unit, 224 Usage start detection unit, 226 Usage end detection unit, 228 Usage information providing unit, 250, 370 User DB, 252 Schedule DB, 300 Usage control ECU, 302 Body control module (BCM), 306 Telematics control unit (TCU), 308 Car-mounted network bus, 310 Vehicle actuating switch (SSSW), 312 Electric power supply system, 314 Door locking mechanism, 322, 344 Wireless device, 326 Start operation detection unit, 328 FOB communication unit, 330 Power supply control unit, 332 Door lock control unit, 350 Door operation reception unit, 352 Electronic key authentication unit, 354 Usage information collection unit, 356 Usage authentication unit, 358 Usage limiting unit, 372 Door unlocking history, 374 Usage end record, 376 Booking information

What is claimed is:

1. A vehicle control system that controls operation of a vehicle to be used by a plurality of users, the vehicle control system comprising:
a schedule management unit that manages a booked usage time range related to usage of the vehicle by each of the users;
an information medium that holds an electronic key that was issued in relation to the booked usage time range and enables usage of the vehicle in said booked usage time range;
a usage end detection unit that detects execution of a usage end procedure of the vehicle for the booked usage time range;
a usage limiting unit that determines whether to permit door unlocking for the vehicle, the door unlocking being performed after the usage end procedure and using the electronic key; and
a door unlocking unit that unlocks a door of the vehicle in response to a door unlocking request made using the electronic key, provided that the usage limiting unit determines to permit door unlocking for the vehicle, wherein
depending on whether or not another booked usage time range exists after one booked usage time range for which the usage end procedure was performed, or whether door unlocking for the vehicle with a key other than the electronic key that was issued for the one booked usage time range was performed during a period from the end of the usage end procedure for the one booked usage time range to a current time, the usage limiting unit determines whether to permit door unlocking for the vehicle at the current time performed with the electronic key that was issued for the one booked usage time range.

2. The vehicle control system according to claim 1, wherein after the usage end procedure and until a start of the other booked usage time range subsequent to the one booked usage time range, the usage limiting unit permits door unlocking for the door unlocking request using the electronic key that was issued in relation to the one booked usage time range.

3. The vehicle control system according to claim 1, wherein during the period after the end of the usage end procedure to the current time, until the door of the vehicle is unlocked with a key other than the electronic key that was issued in relation to the one booked usage time range, the usage limiting unit permits door unlocking in response to the door unlocking request using the electronic key that was issued in relation to said one booked usage time range.

4. The vehicle control system according to claim 1, wherein after the usage end procedure related to the one booked usage time range, when permitting door unlocking made according to the door unlocking request using the electronic key that was issued in relation to the one booked usage time range, the usage limiting unit prohibits the vehicle from being started using said electronic key.

5. The vehicle control system according to claim 1, further comprising a usage information providing unit that notices, after the usage end procedure related to the one booked usage time range, a communication terminal of a user who has taken the usage end procedure, of whether or not the other booked usage time range exists and/or whether unlocking operation for the vehicle occurred after the usage end procedure.

* * * * *